United States Patent
Jodet et al.

(10) Patent No.: US 9,435,214 B2
(45) Date of Patent: Sep. 6, 2016

(54) TURBOMACHINE PROPELLER BLADE SETTING DEVICE

(71) Applicant: SNECMA, Paris (FR)

(72) Inventors: Norman Jodet, Savigny-sur-Orge (FR); Adrien Dubois, Paris (FR); Rasika Fernando, Paris (FR); Mathieu Gruber, Chennevieres-sur-Marne (FR)

(73) Assignee: SNECMA, Paris (FR)

( * ) Notice: Subject to any disclaimer, the term of this patent is extended or adjusted under 35 U.S.C. 154(b) by 447 days.

(21) Appl. No.: 14/044,295

(22) Filed: Oct. 2, 2013

(65) Prior Publication Data
US 2014/0099202 A1  Apr. 10, 2014

(30) Foreign Application Priority Data

Oct. 4, 2012  (FR) ..................... 12 59420

(51) Int. Cl.
| | |
|---|---|
| *B64C 11/06* | (2006.01) |
| *B64C 11/36* | (2006.01) |
| *F01D 7/00* | (2006.01) |
| *F02K 3/06* | (2006.01) |
| *F02C 6/20* | (2006.01) |

(52) U.S. Cl.
CPC .................. *F01D 7/00* (2013.01); *B64C 11/06* (2013.01); *B64C 11/36* (2013.01); *F02C 6/206* (2013.01); *F02K 3/06* (2013.01); *F05D 2260/74* (2013.01); *Y02T 50/673* (2013.01)

(58) Field of Classification Search
CPC ..... B64C 11/06; B64C 11/30; B64C 11/301; B64C 11/305; B64C 11/32; B64C 11/36; F01D 7/00; F01D 7/02; F03D 7/0224
See application file for complete search history.

(56) References Cited

U.S. PATENT DOCUMENTS

| | | | |
|---|---|---|---|
| 8,529,205 B2 * | 9/2013 | Perkinson ............... | B64C 11/38 416/1 |
| 9,174,729 B2 * | 11/2015 | Muren .................. | B64C 27/605 |
| 2009/0220341 A1 | 9/2009 | Schmaling et al. | |
| 2010/0021301 A1 | 1/2010 | Stamps et al. | |
| 2014/0099202 A1 * | 4/2014 | Jodet ........................ | F01D 7/00 416/1 |

FOREIGN PATENT DOCUMENTS

| | | |
|---|---|---|
| EP | 2 332 829 A2 | 6/2011 |
| FR | 2 976 982 A1 | 12/2012 |
| GB | 1 325 670 A | 8/1973 |
| WO | WO 2011/078684 A2 | 6/2011 |

OTHER PUBLICATIONS

Search Report issued Apr. 11, 2014 in United Kingdom Patent Application No. GB1317634.2.
French Preliminary Search Report issued Jul. 8, 2013, in French 1259420, filed Oct. 4, 2012 (with English Translation of Categories of Cited Documents).

* cited by examiner

*Primary Examiner* — Igor Kershteyn
*Assistant Examiner* — Christopher R Legendre
(74) *Attorney, Agent, or Firm* — Oblon, McClelland, Maier & Neustadt, L.L.P.

(57) ABSTRACT

A device for setting a turbomachine propeller blade is provided. The setting device includes a first disc and a second disc respectively provided with first and second coupling devices, the first and second discs being coaxial; and a system for tilting at least one of the first and second discs with respect to the other. During a tilting of at least one of the first and second discs with respect to the other, the coupling distance of the at least one blade on the first and second discs remains constant, bringing about the rotation of the at least one blade.

15 Claims, 5 Drawing Sheets

TURBOMACHINE PROPELLER BLADE SETTING DEVICE

TECHNICAL FIELD

The present invention pertains to the field of turbomachines, and more particularly to systems enabling the setting of a turbomachine propeller blade. It relates to a turbomachine propeller blade setting device, and also the propeller and the turbomachine comprising such a device, as well as an associated method.

The invention applies to any type of terrestrial or aeronautic turbomachine, and particularly to aircraft turbomachines such as turbojet and turboprop engines.

PRIOR ART

Within the framework of acoustic evaluations of a turbomachine propeller of known type, it has been noted that the noise of the specific bands of the propeller, harmonics of the passing frequency of the blades, varies with the incidence angle of the relative flow.

FIG. 1 refers to the case of a propeller in rotation around an axis X in uniform rectilinear movement. In this FIG. 1 is illustrated, schematically and partially, a profile view of the surface S swept by the leading edge of a blade 2 during a rotation of the propeller. The flow relative to this propeller, also known as incoming flow, is designated $M_x$. As a function of the flight conditions of the airplane, the positioning of the propeller relatively to the incoming flow is variable. For example, in the case of taking off, climbing or landing, the propeller is in incidence with respect to the incoming flow. In the referential of the propeller, the incoming flow $M_x$ thus has an angle a with its axis of rotation X.

The presence of such an incidence angle a brings about a dissymmetry of the loads (axial efforts and tangential efforts) on the disc formed by the sweeping of the surface S. FIGS. 3A and 3B represent respectively the distribution of the density of tangential forces and the distribution of the density of axial forces (in N/m) on the disc formed by the sweeping of the surface S of the leading edge of the blade 2 during a rotation, for an incidence angle a equal to 1°, 2° and 3°. The non-uniformity of the grey scales well takes into account the dissymmetry of the loads applied to the disc.

This dissymmetry of loads may be understood by considering the velocity triangles for a profile of blade 2 (in a given radius) in rotation, as represented schematically and partially in FIGS. 2A and 2B. In these FIGS. 2A and 2B, the incoming flow is designated $M_x$, the flow relative to the rotation is designated $M_t$ and the resultant, the flow relative to the blade 2, is designated $M_{rel}$. Thus, the load depends on the incidence angle b of the flow relative to the blade $M_{rel}$ with respect to the Y axis of the blade 2.

FIG. 2A represents an incoming flow $M_x$ at zero incidence (a=0°), i.e. a flight at constant altitude for example, whereas FIG. 2B represents an incoming flow $M_x$ at non-zero incidence a for a descending blade 2. It may thus be noted geometrically that the angle b, and thus the load, varies as a function of the incidence a of the incoming flow $M_x$. More particularly, for a descending blade 2 in an incoming flow $M_x$ in incidence (FIG. 2B), it is determined geometrically that the angle b increases, as well as the load, which corresponds to the parts situated on the left on the discs of FIGS. 3A and 3B. Conversely, for a rising blade 2, the load reduces because the angle b is smaller than when there is no incidence, which corresponds to the parts situated on the right on the discs of FIGS. 3A and 3B.

Consequently, as is clearly apparent from FIGS. 3A and 3B, it may be noted that: a) on the one hand, for the two types of loads (tangential efforts and axial efforts), the blades are always more loaded when their movement is opposed to the incoming flow $M_x$ (left parts of the discs of FIGS. 3A and 3B) and less loaded when their movement accompanies the incoming flow $M_x$ (right parts of the discs of FIGS. 3A and 3B). Thus, the flow relative to the blade $M_{rel}$ of a descending blade (left parts of the discs) is greater than the flow relative to the blade $M_{rel}$ of a rising blade (right parts of the discs), and the angle b is also greater for a descending blade 2 than for a rising blade 2; b) on the other hand, the greater the incidence angle a, the greater the imbalance between the loads because the intensity of the interactions between the incoming flow $M_x$ and the blade profiles increases.

The load of the blades being directly responsible for their own noise, this dissymmetry of loads is the source of a significant increase in sound levels at the propeller level, particularly in conditions of taking off, climbing and landing. This increase in the level of noise is quite particularly undesirable and critical, especially given that the acoustics of aircraft are certified at certain flight points, and in particular during taking off, climbing and landing.

The observations made in FIGS. 3A and 3B with the distribution of the density of tangential and axial forces are also found at the level of the acoustics. In particular, a prediction study of the harmonic acoustic levels for different incidence angles makes it possible to show that: a) on the one hand, the levels of the first harmonics are higher for a descending blade (left parts of the discs of FIGS. 3A and 3B) than for a rising blade (right parts of the discs of FIGS. 3A and 3B); b) on the other hand, the noise level for a descending blade increases with the incidence angle a whereas the noise level for a rising blade decreases with the incidence angle a. The levels of the harmonics are thus higher in the areas where the blades are the most loaded.

Consequently, the noise generated at the level of the propeller is directly linked to the distribution of the loads on the blades of the propeller.

Moreover, in a conventional and known manner, the pitch of a propeller is uniform, in other words it is the same for all the blades of the propeller. In other words, the setting of the blades of the propeller is uniform. Yet, as explained previously, the load that applies on the propeller during certain flight phases with incidence, particularly during taking off, climbing and landing, is not uniform, thereby causing force concentration zones, responsible for amplified noise.

Patent application EP 2 332 829 A2 describes a mechanism for controlling the pitch of a propeller to adapt the setting of the blades of the propeller to non-uniform flow. Nevertheless, this mechanism is of complex conception and its passive operation, which is based on a modification of the setting by the force exerted by the flow on the blades, does not make it possible to force the propeller to maintain a homogeneous pitch and may be the source of important energy dissipation.

DESCRIPTION OF THE INVENTION

The aim of the invention is to overcome at least partially the aforementioned needs and drawbacks relative to the embodiments of the prior art.

The invention particularly aims to enable a rebalancing of the loads around the propeller in order to alleviate the noise generated by dissymmetry thereof. The aim of the invention is particularly to propose a solution to enable a heterogeneous setting of the blades of the propeller, capable of attributing if necessary a different setting to each blade as a function of its angular position in the course of rotation to optimise the adaptation of the positioning of the blade to the incoming flow.

Moreover, the invention also proposes conceiving a solution for the setting of turbomachine propeller blades that is more compact and structurally simpler than solutions known from the prior art.

The subject matter of the invention, according to one of its aspects, is thus a device for setting at least one blade of a turbomachine propeller, characterised in that it comprises:
- a first disc provided with first coupling means intended to cooperate with at least one first coupling point of said at least one blade for its fixation on the first disc,
- a second disc provided with second coupling means intended to cooperate with at least one second coupling point of said at least one blade for its fixation on the second disc, the first and second discs being coaxial,
- means of tilting at least one of the first and second discs with respect to the other, the device being configured so that, during a tilting of at least one of the first and second discs with respect to the other, the coupling distance of said at least one blade on the first and second discs, which corresponds to the distance between said at least one first and one second coupling points cooperating respectively with the first and second coupling means, remains constant, bringing about the rotation of said at least one blade.

Thanks to the invention, it may be possible to act in an active manner on the setting device, particularly through means of tilting, to modify the setting of at least one blade by causing its rotation. It may thus be possible to perform a heterogeneous setting of the blades of a propeller, in other words a setting that can be different for each blade, in order to adapt to a non-homogeneous distribution of loads on the propeller when the incoming flow is in incidence with respect to the axis of rotation of the propeller, and thus enable a reduction in the noise normally generated by a dissymmetry of distribution of loads.

The device according to the invention may moreover comprise one or more of the following characteristics taken in isolation or according to any technically possible combinations thereof.

The first coupling means and the second coupling means may respectively be configured to cooperate with said at least one first and one second coupling points by forming a slide type mechanical link. Thus, said at least one first and one second coupling points may be able to move by translation movement relatively to the first and second coupling means of the discs.

The first and second coupling means may comprise openings of substantially oblong shape to respectively enable the fixation of said at least one first and one second coupling points.

The number of openings may depend on the number of blades intended to be fixed on the device. Preferably, the first and second discs comprise the same number of openings forming respectively the first and second coupling means, and the openings are identical, but it could be otherwise.

One of the first and second discs may be fixed whereas the other is movable. In particular, the movable disc may be able to tilt relatively to the fixed disc so as to reduce the distance separating the discs during tilting.

The means of tilting may comprise actuators, particularly piston actuators, able to modify the orientation of at least one of the first and second discs with respect to the other, particularly the movable disc, and the distance separating the first and second discs, by a translation movement.

The number of actuators may preferably be equal to 3, which is enough to tilt the movable disc in any direction. The actuators can make it possible to reduce locally the distance between the discs in a manner independent of each other.

The means of tilting may further comprise a stop for actuators making it possible to establish sliding between at least one of the first and second discs, particularly the movable disc, and the actuators. In this way, it may be possible to control the orientation of the inclinable disc in an independent marker. Moreover, the addition of such a stop may advantageously enable the device to be made rigid.

The means of tilting may comprise a spring able to maintain a constant pressure on at least one of the first and second discs, particularly the movable disc, to maintain it against the actuators, in particular against the stop for actuators.

The means of tilting may also comprise a linear-spherical connecting joint to assure the link between at least one of the first and second discs, able to tilt, and the axis of the discs.

The device according to the invention may moreover comprise a servo-control system of the actuators, able to control the operation of the actuators as a function of at least one acoustic measurement, particularly of the incoming flow, also known as incident flow or flux, this acoustic measurement being for example performed on the fuselage of the aircraft comprising a turbomachine according to the invention, or on the nacelle of the turbomachine. This or the acoustic measurements may be preferably located around the turbomachine and/or close to the propeller comprising a device according to the invention.

In other words, the movement of the actuators, particularly their translation movement, making it possible to modify the orientation of one disc with respect to the other, may be conditioned by at least one acoustic measurement of the incident flux. Thus, in view of the needs set forth previously in the section relating to the prior art, it may be possible to perform a setting of the blades of a propeller, through the enslavement of the actuators on at least one acoustic measurement, in order to obtain a homogeneous or heterogeneous setting that is correctly adapted to the acoustic evaluations obtained by the servo-control system. The setting of the blades performed through the setting device according to the invention may in this way be optimised from the acoustic point of view. Preferably, one or several acoustic measurements are performed on the circumference of the turbomachine comprising a device according to the invention so as to help directly assess the state of load imbalance and facilitate correction.

The subject matter of the invention, according to another of its aspects, is also a propeller for turbomachine characterised in that it comprises a device as defined previously.

The propeller may comprise at least one blade provided with at least one first coupling point and at least one second coupling point cooperating respectively with the first and second coupling means of the device.

The first coupling point may for example be situated in the extension of the trailing edge of the blade. The second coupling point may for example be situated in the extension of the leading edge of the blade.

The blade may for example comprise a base or platform from which extend the first and second coupling points, particularly parallel to each other. The first and second coupling points may for example be rectilinear rods, also known as setting control rods, intended to cooperate respectively with the first and second coupling means.

The orientation of the imaginary line linking the first and second coupling points can make it possible to define the setting of the blade.

The subject matter of the invention, according to another of its aspects, is also a turbomachine characterised in that it comprises a device as defined previously or a propeller as defined previously.

The subject matter of the invention, according to another of its aspects, is also a method for setting at least one blade of a turbomachine propeller, characterised in that it comprises the following steps:

said at least one blade is fixed on a first disc provided with first coupling means and on a second disc provided with second coupling means, the first and second coupling means cooperating respectively with at least one first coupling point and at least one second coupling point of said at least one blade for its fixation on the first and second discs, the first and second discs being coaxial, at least one of the first and second discs is tilted with respect to the other while maintaining constant the coupling distance of said at least one blade on the first and second discs, which corresponds to the distance between said at least one first and one second coupling points cooperating respectively with the first and second coupling means, thus bringing about the rotation of said at least one blade.

Moreover, the method may comprise a step of enslavement of the actuators through a servo-control system, able to control the operation of the actuators as a function at least of one acoustic measurement, particularly of the incoming flow, this acoustic measurement being for example carried out on the fuselage of the aircraft comprising a turbomachine according to the invention, or on the nacelle of the turbomachine. This or the acoustic measurements may be preferably located around the turbomachine and/or close to the propeller comprising a device according to the invention.

The propeller, the turbomachine and the method according to the invention may comprise any of the aforementioned characteristics, taken in isolation or according to any technically possible combination thereof with other characteristics.

BRIEF DESCRIPTION OF DRAWINGS

The invention will be able to be better understood on reading the detailed description given hereafter of a non-limiting example of embodiment thereof, and by examining the figures, schematic and partial, of the appended drawings, in which.

In all of these figures, identical references can designate identical or analogous components.

In addition, in order to make the figures more legible, the different parts represented in the figures are not necessarily given to a uniform scale.

DETAILED DESCRIPTION OF A PARTICULAR EMBODIMENT

An example of embodiment of a device 1 for setting a blade 2 of a turbomachine propeller according to the invention will be described hereafter, with reference to FIGS. 4 to 9.

In this example, the device 1 may enable the fixation and the setting of four propeller blades 2, but it could be otherwise.

Figure 1:
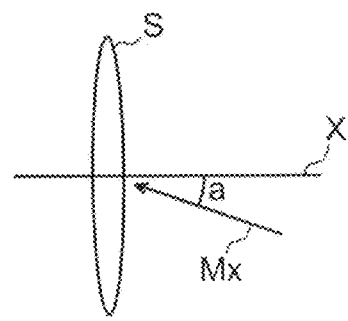
FIG. 1 illustrates in profile the surface swept by the leading edge of a blade of a propeller of known type.
Figure 2A:
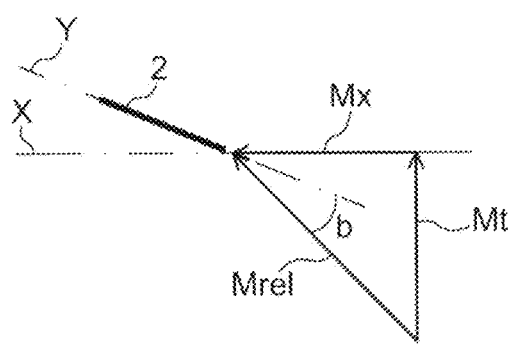
FIGS. 2A and 2B represent the velocity triangles for a profile of blade of a propeller of known type in rotation.
Figure 2B:
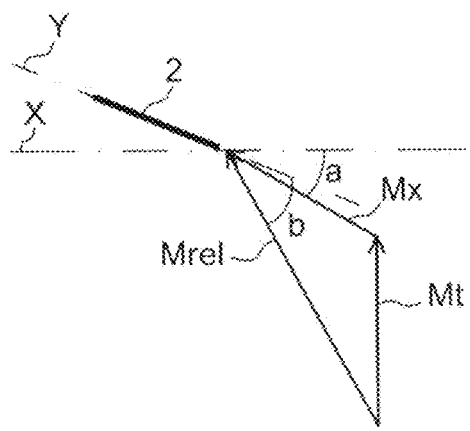
Figure 3A:
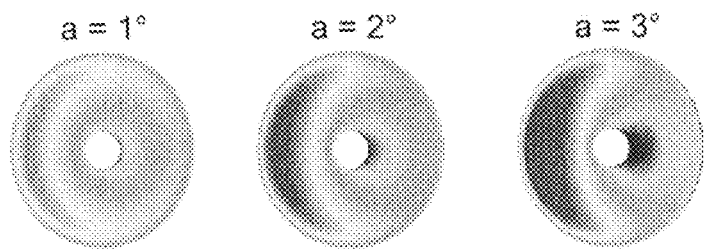
FIGS. 3A and 3B represent respectively the distributions of density of tangential forces and density of axial forces on different discs formed by the sweeping of the surface of the leading edge of a blade of a propeller of known type during a rotation.
Figure 3B:
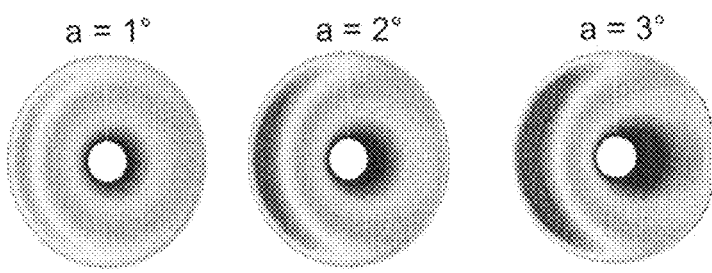
Figure 4:
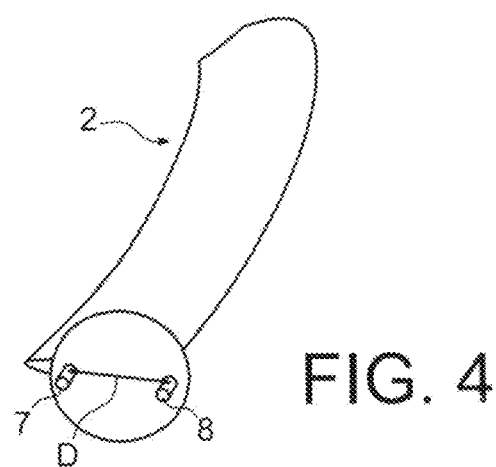
FIG. 4 represents, in perspective, an example of a blade comprising first and second coupling points for its fixation on a device according to the invention.
Figure 5:
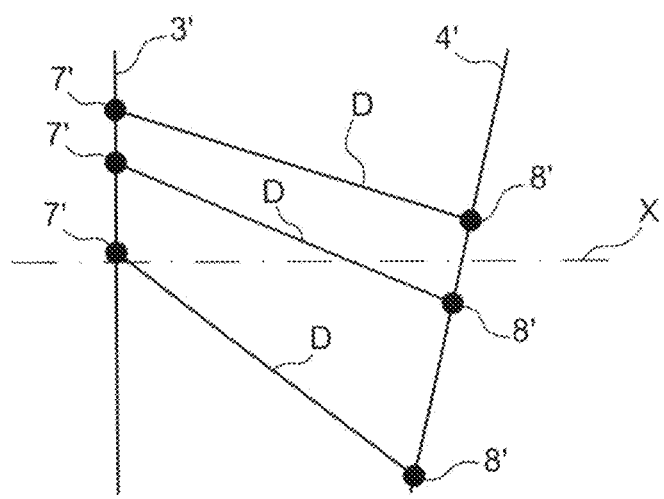
FIG. 5 illustrates the principle making it possible to maintain constant the coupling distance of the blade of FIG. 4 on a device according to the invention.

The basic operating principle of the setting device 1 according to the invention has been illustrated schematically by means of FIGS. 4 and 5.

In FIG. 4 is represented a blade 2 intended to be fixed on the device 1. To do this, the blade 2 comprises first 7 and second 8 coupling points, in the form of setting control rods, for example integral with a base or platform of the blade 2.

The first coupling point 7 is situated in the extension of the trailing edge of the blade 2, and the second coupling point 8 is situated in the extension of the leading edge of the blade 2. The imaginary line that connects the two coupling points 7 and 8 constitutes a segment of which the orientation can make it possible to define the setting of the blade 2. The distance that separates the two coupling points 7 and 8 makes it possible to define the coupling distance D of the blade 2 on the device 1.

In order to be able to modify the setting of the blade 2 on the propeller, and thus make it possible to adapt to a dissymmetry of the loads applied to the propeller with the aim of reducing the noise generated by the propeller, it is necessary to be able to modify the orientation of the blade 2, in other words to enable a rotation of the blade 2.

FIG. 5 illustrates schematically the principle of the invention. A first disc 3' (top view) is situated opposite a second disc 4', the first 3' and second 4' discs being coaxial along the axis of rotation X.

The blade 2 is fixed to the first disc 3' at the level of an imaginary coupling point 7', and fixed on the second disc 4' at the level of an imaginary coupling point 8'.

The invention is consequently based on the fact that the device 1 is provided so that during the tilting of the second disc 4' with respect to the first disc 3', the imaginary coupling points 7' and 8' can move along the discs 3' and 4' so as to maintain constant the coupling distance D of the blade 2. As may be seen in FIG. 5, this mechanism then causes a change of orientation of the imaginary segments D and thus the rotation of the blade 2, enabling a modification of the setting.

The device 1 is shown in rotation with the boss of the propeller, and in this way the setting of the blade 2 can vary periodically as a function of the angular position of the blade 2 around the boss.

FIGS. 6 to 9 represent, under different views and for different configurations, an example of device 1 according to the invention.

Figure 6:
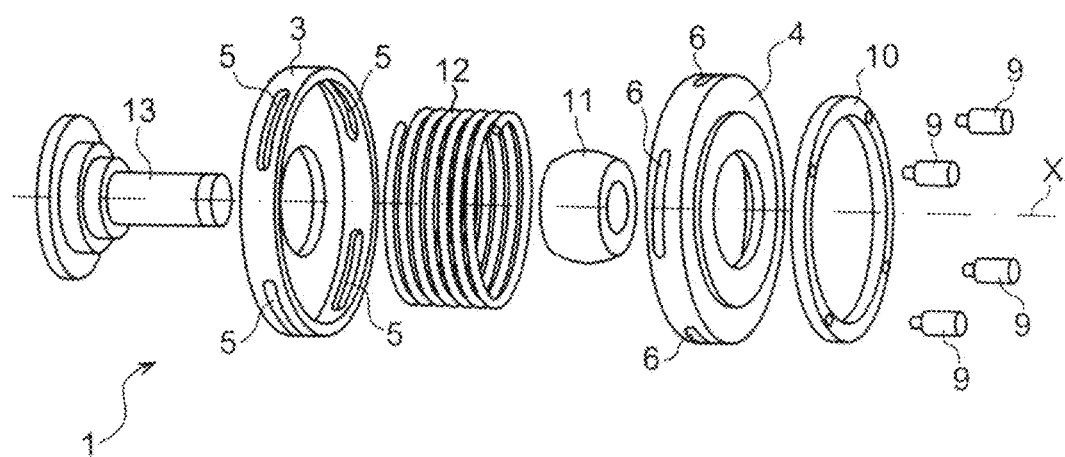
FIG. 6 is an exploded view, in perspective, of an example of a device according to the invention.

As may be seen in FIG. 6, the device 1 comprises:
an axle support 13, on which are placed the other components of the device 1, the axle support 13 being in flush connection with the boss of the propeller,
a first fixed disc 3, in flush connection with the axle support 13,
a spring 12,
a linear-spherical connecting joint 11,
a second movable and inclinable disc 4,
a stop 10 for actuators, and
four piston actuators 9.

The first 3 and second 4 discs comprise first 5 and second 6 coupling means in the form of openings of oblong shape. The oblong shape of the openings can make it possible to serve as guide by a translation movement of the coupling points 7 and 8 of the blade 2, so as to constrain uniquely the axial position of said coupling points 7 and 8.

The spring 12 can make it possible to maintain a constant pressure on the second movable disc 4 to keep it pressed against the stop 10 and the actuators 9.

The connecting joint 11 can make it possible to establish the link between the second movable disc 4 and the X axis. The connecting joint 11 comprises a reaming enabling it to slide on the X axis so as to enable a variation in the distance between the first 3 and second 4 discs. Moreover, the spherical surface of the connecting joint 11 can make it possible to make the second disc 4 movable in incidence with respect to the first fixed disc 3, such that the distance between the discs 3 and 4 can vary as a function of the angular position.

The stop 10 for actuator constitutes a bearing making it possible to establish the sliding between the second movable disc 4 and the actuators 9. In this way, it may be possible to control the orientation of the second disc 4 in an independent marker, i.e. without rotation.

The four piston actuators 9 can make it possible to control locally the distance that separates the first 3 and second 4 discs by a translation movement with respect to the second disc 4 movable in four points, in an independent manner.

Figure 7:
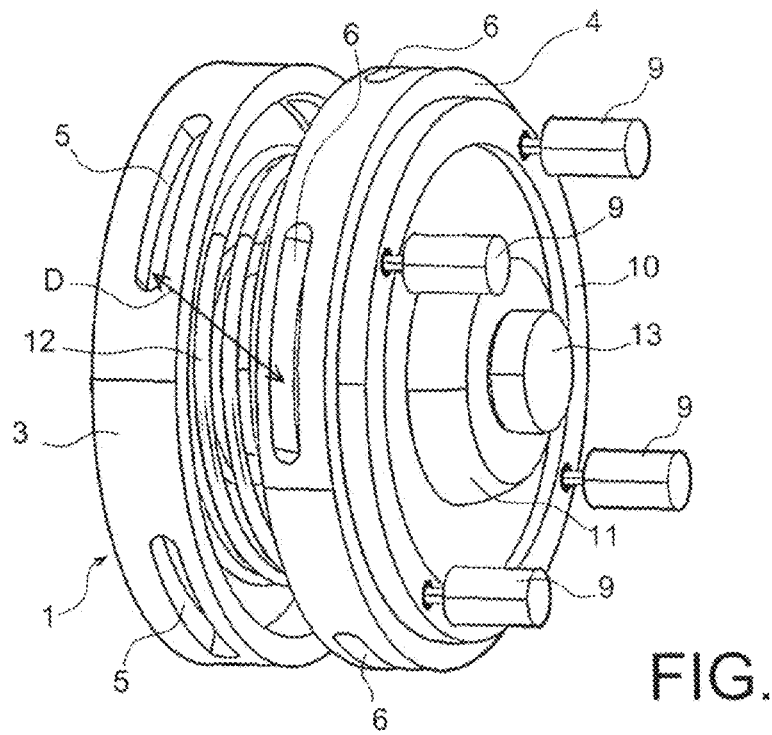
FIG. 7 is a perspective view of the device of FIG. 6 in a configuration where the discs are parallel to each other.
Figure 8:
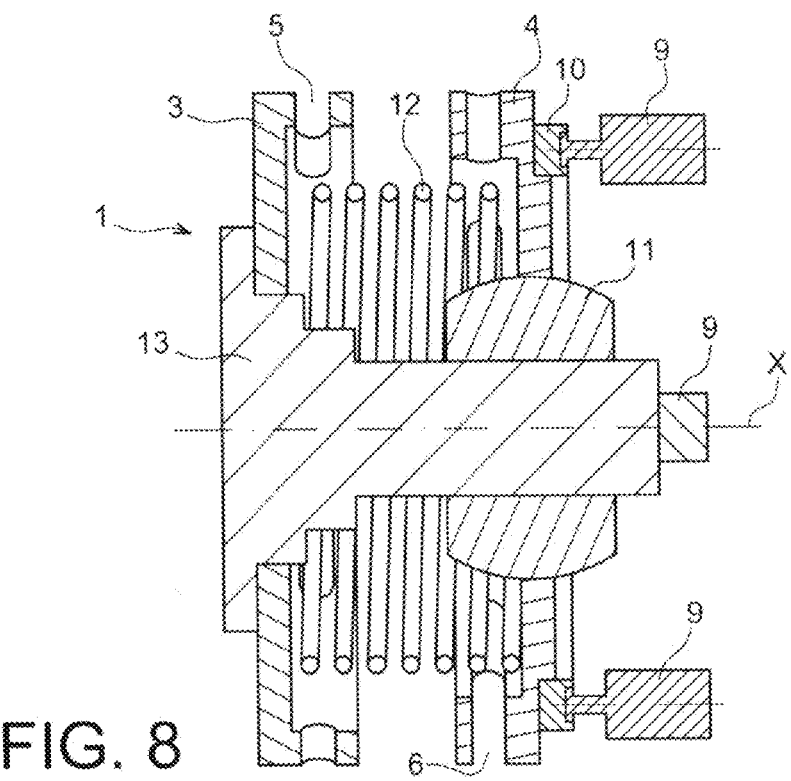
FIG. 8 is a sectional view of the device of FIG. 6.

FIG. 7 represents, in perspective, the device 1 according to the invention in a configuration where the first 3 and second 4 discs are parallel to each other. In this way, all the blades 2 intended to be fixed on the device 1 have the same setting. This configuration corresponds for example to an operation of the device 1 in a flow having uniquely an axial velocity.

Figure 9:
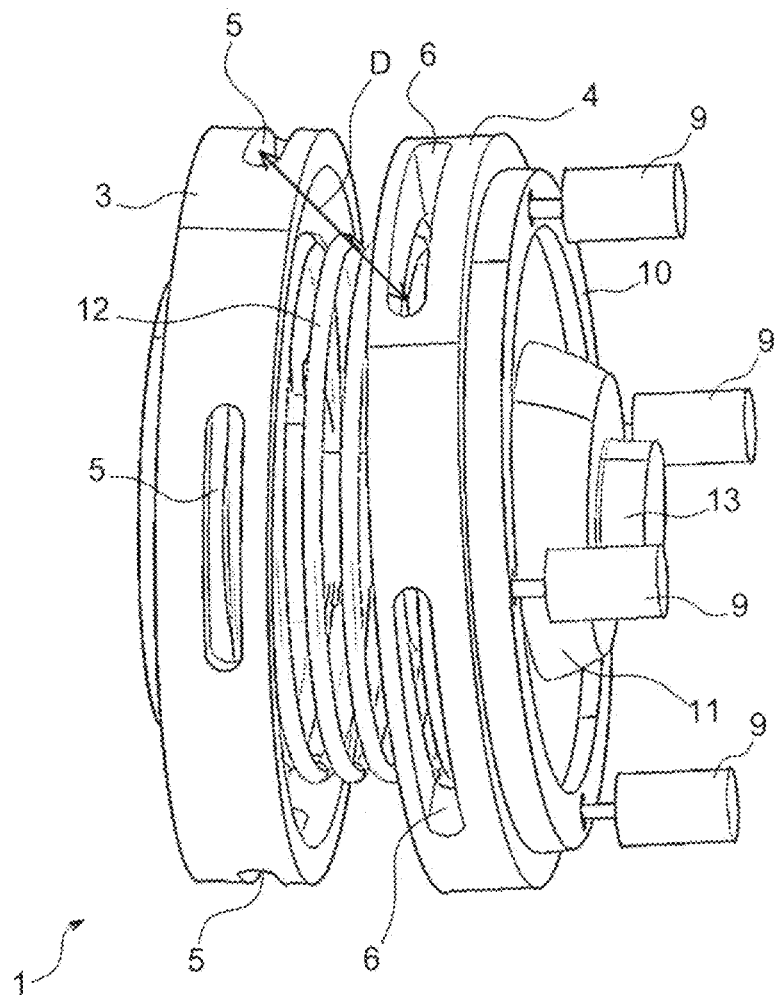
FIG. 9 is a perspective view of the device of FIG. 6 in a configuration where the discs are tilted with respect to each other.

In FIG. 9 is represented, in perspective, a configuration of the device 1 according to the invention in which the second movable disc 4 is tilted with respect to the first fixed disc 3. The tilting of the second disc 4 with respect to the first disc 3 can make it possible to change periodically the setting of the blades 2 during a complete rotation of the propeller, so as to improve the acoustic signature of an operation in a flow with incidence.

As has been represented in FIGS. 7 and 9, the maintaining constant of the distance D corresponding to the distance between the first 7 and second 8 coupling points cooperating respectively with the first 5 and second 6 coupling means is made possible by a sliding of the first 7 and second 8 coupling points in the oblong openings formed on the first 3 and second 4 discs, this sliding accompanying a change of orientation and of rotation of the blades 2.

The device 1 according to the invention, represented in FIGS. 6 to 9, may for example operate in the following manner.

A measuring device may be used to know the distribution of the loads around the boss in order to enslave the device 1 to maintain as homogeneous as possible a distribution of loads.

For example, in the case where the load around the propeller is evenly distributed, it is possible to vary the setting in a homogeneous manner, by increasing or by reducing the pressure in all of the piston actuators 9 to make the second movable disc 4 translate.

On the other hand, in the case where the load around the propeller is unbalanced, it is possible to control the piston actuators 9 in an independent manner to locally parameterize the necessary distance between the first 3 and second 4 discs.

The device 1 according to the invention has several advantages, particularly in acoustic, mechanical and aerodynamic performance terms.

In acoustic terms, the device 1 can make it possible to approach an operation substantially identical to that of a zero incidence in all conditions, knowing that the average incidence of a propeller in operation is normally of the order of 1 to 9° as a function of flight points and each additional degree of incidence is responsible for around two additional decibels on the band noise of the unfavourable side of the propeller.

In terms of mechanics, the device 1 can make it possible to act on the stress of a cyclically variable load to which a blade is normally subjected, by giving to the blade a more constant operation.

In terms of aerodynamic performance, the device 1 can make it possible to adapt the blades to the incidence effects, given that conventional optimisation of blade setting does not take into account the effects of incidence.

Moreover, the device 1 according to the invention may enable an active control of the setting of the blades by direct action on the actuators 9. It may thus be possible to force the propeller to maintain a homogeneous pitch. The translation and the tilting of the second movable disc 4 can be achieved by the control of the actuators 9 alone.

The use of a linear-spherical connecting joint 11 can make it possible to adapt the use of the device 1 according to the invention to different turbomachine configurations, for example such as those with unducted fans, referred to as "open rotor", where the propeller is positioned directly on the engine.

Obviously, the invention is not limited to the embodiment example that has been described. Various modifications may be made by those skilled in the art.

Moreover, in the example described previously, the operation of the actuators 9, to make it possible to modify the orientation of the first 3 and second 4 discs with respect to each other, may be enslaved on at least one acoustic measurement of the incident flux, carried out particularly on the circumference of a turbomachine according to the invention. In particular, the translation movement of the actuators 9 may be activated or not as a function of the results of acoustic measurements of the incident flux carried out by a servo-control system.

The expression "comprising a" should be understood as being synonymous with "comprising at least one" unless the opposite is specified.

The invention claimed is:
1. A device for setting at least one blade of a turbomachine propeller, comprising:
a first disc provided with first coupling means configured to cooperate with at least one first coupling point of said at least one blade for fixation on the first disc;

a second disc provided with second coupling means configured to cooperate with at least one second coupling point of said at least one blade for fixation on the second disc, the first and second discs being coaxial; and means of tilting at least one of the first and second discs with respect to the other, the device being configured so that, during a tilting of at least one of the first and second discs with respect to the other, a coupling distance of said at least one blade on the first and second discs, which corresponds to a distance between said at least one first and one second coupling points cooperating respectively with the first and second coupling means, remains constant, bringing about rotation of said at least one blade, the first coupling means and the second coupling means being respectively configured to cooperate with said at least one first and one second coupling points by forming a slide type mechanical link, the means of tilting comprising actuators able to modify an orientation of at least one of the first and second discs with respect to the other and a distance separating the first and second discs, by a translation movement, and the means of tilting comprising a stop for the actuators so as to establish sliding between at least one of the first and second discs and the actuators.

2. The device according to claim 1, wherein the first and second coupling means comprise openings of substantially oblong shape to respectively enable the fixation of said at least one first and one second coupling points.

3. The device according to claim 1, wherein one of the first and second discs is fixed and the other of the first and second discs is movable.

4. The device according to claim 1, wherein the actuators are piston actuators.

5. The device according to claim 1, wherein the means of tilting further comprise a linear-spherical connecting joint to assure a link between at least one of the first and second discs, which is able to tilt, and an axis of the discs.

6. The device according to claim 1, further comprising a servo-control system of the actuators, which is able to control operation of the actuators as a function at least of one acoustic measurement.

7. The device according to claim 6, wherein the servo-control system of the actuators is able to control the operation of the actuators as a function of at least one acoustic measurement of the incoming flow.

8. The device according to claim 6, wherein said at least one acoustic measurement is performed around a turbomachine and/or close to a propeller comprising said device.

9. A propeller for a turbomachine comprising a device according to claim 1.

10. The propeller according to claim 9, comprising at least one blade provided with the at least one first coupling point and the at least one second coupling point cooperating respectively with the first and second coupling means of the device.

11. A turbomachine comprising a device according to claim 1.

12. A method of setting at least one blade of a turbomachine propeller, comprising:

fixing said at least one blade on a first disc provided with first coupling means and on a second disc provided with second coupling means, the first and second coupling means cooperating respectively with at least one first coupling point and at least one second coupling point of said at least one blade for fixation on the first and second discs, the first and second discs being coaxial, the first coupling means and the second coupling means being respectively configured to cooperate with said at least one first and one second coupling points forming a slide type mechanical link;

tilting at least one of the first and second discs with respect to the other using means of tilting while maintaining constant a coupling distance of said at least one blade on the first and second discs, which corresponds to a distance between said at least one first and one second coupling points cooperating respectively with the first and second coupling means, thereby bringing about rotation of said at least one blade, the means of tilting comprising actuators able to modify the orientation of at least one of the first and second discs with respect to the other and the distance separating the first and second discs, by a translation movement, and a stop for the actuators so as to establish sliding between at least one of the first and second discs and the actuators.

13. The method according to claim 12, further comprising enslaving the actuators through a servo-control system, which is able to control operation of the actuators as a function at least of one acoustic measurement.

14. The method according to claim 13, wherein the servo-control system of the actuators is able to control the operation of the actuators as a function of at least one acoustic measurement of the incoming flow.

15. The method according to claim 13, wherein said at least one acoustic measurement is performed around a turbomachine and/or close to a propeller comprising said device.

* * * * *